(12) United States Patent
Schunk (10) Patent No.: US 12,108,750 B1
(45) Date of Patent: Oct. 8, 2024

(54) CHUMMING DEVICE

(71) Applicant: Martin Schunk, Enfield, NH (US)

(72) Inventor: Martin Schunk, Enfield, NH (US)

(*) Notice: Subject to any disclaimer, the term of this patent is extended or adjusted under 35 U.S.C. 154(b) by 0 days.

(21) Appl. No.: 18/481,435

(22) Filed: Oct. 5, 2023

(51) Int. Cl.
   *A01K 97/02* (2006.01)

(52) U.S. Cl.
   CPC .................................. *A01K 97/02* (2013.01)

(58) Field of Classification Search
   CPC ........ A01K 97/02; A01K 97/04; A63B 65/12; A63B 65/122; B25F 5/022; B25F 5/023; B25H 1/0085; G01G 19/56; G01G 19/58; F23Q 25/00
   USPC ....................................................... 43/44.99
   See application file for complete search history.

(56) References Cited

U.S. PATENT DOCUMENTS

| | | | | |
|---|---|---|---|---|
| 531,954 A * | 1/1895 | Langer | ................... | G01G 19/58 |
| | | | | 177/149 |
| 1,585,446 A * | 5/1926 | Warwick | ................ | A63B 59/20 |
| | | | | 124/5 |
| 2,941,327 A | 6/1960 | Rundell | | |
| 3,428,036 A * | 2/1969 | Parker | ................... | A63B 59/20 |
| | | | | 73/862.541 |
| 3,589,349 A * | 6/1971 | Parker | ................... | A63B 60/08 |
| | | | | 124/5 |
| 4,677,961 A * | 7/1987 | Allison | ...................... | F41J 9/28 |
| | | | | D22/114 |
| 4,873,963 A * | 10/1989 | Lemmen | ................... | F41B 3/02 |
| | | | | 124/20.3 |
| 5,046,387 A * | 9/1991 | Levake | ................. | B25G 1/102 |
| | | | | 33/379 |
| 7,225,584 B1 * | 6/2007 | Speidell | ................ | A01K 97/02 |
| | | | | 43/44.99 |
| 7,520,086 B2 | 4/2009 | Melhorn et al. | | |
| 8,327,832 B2 * | 12/2012 | Henry | .................... | A63H 33/18 |
| | | | | 124/5 |
| 9,387,383 B2 * | 7/2016 | Hou | ..................... | A63B 69/0002 |
| 9,656,136 B2 * | 5/2017 | Van Alen | ................ | A63B 59/20 |
| 11,333,495 B1 * | 5/2022 | Caprio | ..................... | G01C 9/36 |
| 2006/0218848 A1 | 10/2006 | Melhorn et al. | | |
| 2007/0199236 A1 | 8/2007 | Brzozowski | | |
| 2016/0096095 A1 * | 4/2016 | Williams | ............... | A63B 60/34 |
| | | | | 124/5 |
| 2018/0368380 A1 | 12/2018 | Rosier | | |

FOREIGN PATENT DOCUMENTS

| | | | | |
|---|---|---|---|---|
| CN | 204298418 U * | 4/2015 | ............. | C21C 5/46 |
| GB | 2195871 A * | 4/1988 | ............. | A01K 97/02 |
| KR | 101483238 B1 * | 1/2015 | ............. | F23Q 25/00 |
| WO | WO-2006074311 A1 | 7/2006 | | |

* cited by examiner

*Primary Examiner* — Peter M Poon
*Assistant Examiner* — Danielle A Clerkley
(74) *Attorney, Agent, or Firm* — Wilmer Cutler Pickering Hale and Dorr LLP (57) ABSTRACT

Embodiments for a chum throwing device are disclosed. In a non-limiting embodiment, the chum throwing device includes a shaft having a proximal end and a distal end. The device also includes a container having a closed end attached to the shaft and an open end that faces away from the shaft. A level is attached to the shaft to provide an indication of whether the container is tilted or whether the container is aligned properly for use.

17 Claims, 13 Drawing Sheets

CHUMMING DEVICE

FIELD OF THE DISCLOSURE

Embodiments of the disclosure relate to chum distributors for fishing. In some non-limiting implementations, the disclosure relates to chum throwing devices for projecting chum into a targeted area of water to attract fish.

BACKGROUND OF THE DISCLOSURE

Recreational or sport fishing has experienced a surge in popularity, becoming a year-round activity for millions across the globe. Some anglers prefer a more relaxed form of fishing that involves casting a fishing line, baited hook, and a sinker-type device into the water to attract fish, either visually or through scent. Other fishermen may additionally use chum or bait to entice fish to a particular area of water. It has been discovered that maintaining chum close to a hook can improve the chance of catching a fish. For instance, chum could be situated in a container near an area where one plans to place a hook. By doing so, the chum's aroma will be concentrated in the desired location, increasing the likelihood of attracting fish. Alternatively, some fishermen may drop chum into the water behind a moving boat while trolling with a lure so that the lure is pulled through the body of water with the chum.

Devices to dispense chum into water may include, for example, mesh pots, net bags, and fishing bait catapults. However, these devices for projecting chum are either complex, inaccurate and/or messy. For example, slingshot style devices often have holes in the chum holding area so that liquid forms of chum cannot be used. Further, many devices require the use of two hands and often can project only a limited about of chum. Some devices include a chum-holding bowl attached to a handle that the user swings to cause chum to fly out of the bowl. However, these devices are often inaccurate and cause chum to spill onto the user.

SUMMARY OF THE DISCLOSURE

Embodiments of a chum throwing device are disclosed. A chum throwing device is provided that includes a shaft having a proximal end and a distal end. A container is attached to the shaft and is configured to hold chum. The container has an open end that faces away from the shaft. A level is attached to the shaft and is indicative of a rotational position of the container around a central longitudinal axis of the shaft.

In some embodiments, the container comprises a shoulder portion and a waist portion. The shoulder portion has a diameter that is less than a diameter of the waist portion, and the waist portion is flanged outwardly toward the open end of the container. In some embodiments, the container has a closed end attached to the shaft and has a central longitudinal axis that extends between the closed end and the open end. The container is positioned on the shaft so an angle between the central longitudinal axis of the shaft and the central longitudinal axis of the container is between 100 degrees and 110 degrees. The angle may be approximately 105 degrees.

In some embodiments, the shaft includes a groove that extends longitudinally on a back portion of the shaft that faces away from the open end of the container for assisting a user with aiming the device. The groove is contactable by a portion of a user's hand, such as a thumb, and provides verification that the opening of the container faces in a direction toward a targeted area of water.

The shaft may also include an enlarged portion at the proximal end for mounting the level. The enlarged portion has a diameter that is larger than a diameter of the shaft at a location other than the enlarged portion. The level may comprise a gas bubble that is centered when the shaft is held horizontally and the container is not tilted to a left side or a right side when looking down the central longitudinal axis of the shaft. The bubble is not centered when the shaft is held horizontally and the container is tilted to the left side or the right side. The level may comprise a sealed tube that includes the gas bubble and visible lines that demarcate a center portion of the level.

In some embodiments, the device comprises an adjuster with interlocking pieces that are maintained in place with a threaded fastener. Loosening the fastener allows the interlocking pieces to move independently of each other and tightening the fastener causes the interlocking pieces to press together in a locking manner. A position of the container is changed when the interlocking pieces are moved with respect to each other.

A method of chumming is provided. The method comprises using a chum throwing device that comprises a shaft, a level, and a container with an opening that faces away from the shaft. The throwing device is leaned backwards toward a horizontal position so that the level is indicative of the container not being tilted to a left longitudinal side of the shaft or a right longitudinal side of the shaft. The throwing device is swung so that the container makes an arching motion. The motion is then stopped so that the throwing device rests in an upright position with the container facing in a direction aligned with a trajectory of the container produced by the swinging.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

Various objectives and features of the disclosed subject matter can be more fully appreciated with reference to the following detailed description of the enclosed subject matter when considered in connection with the following drawings, in which like reference numerals identify like elements. The following drawings should not be construed as limiting the present disclosure and are intended to be illustrative only.

DETAILED DESCRIPTION OF EMBODIMENTS

Figure 1:
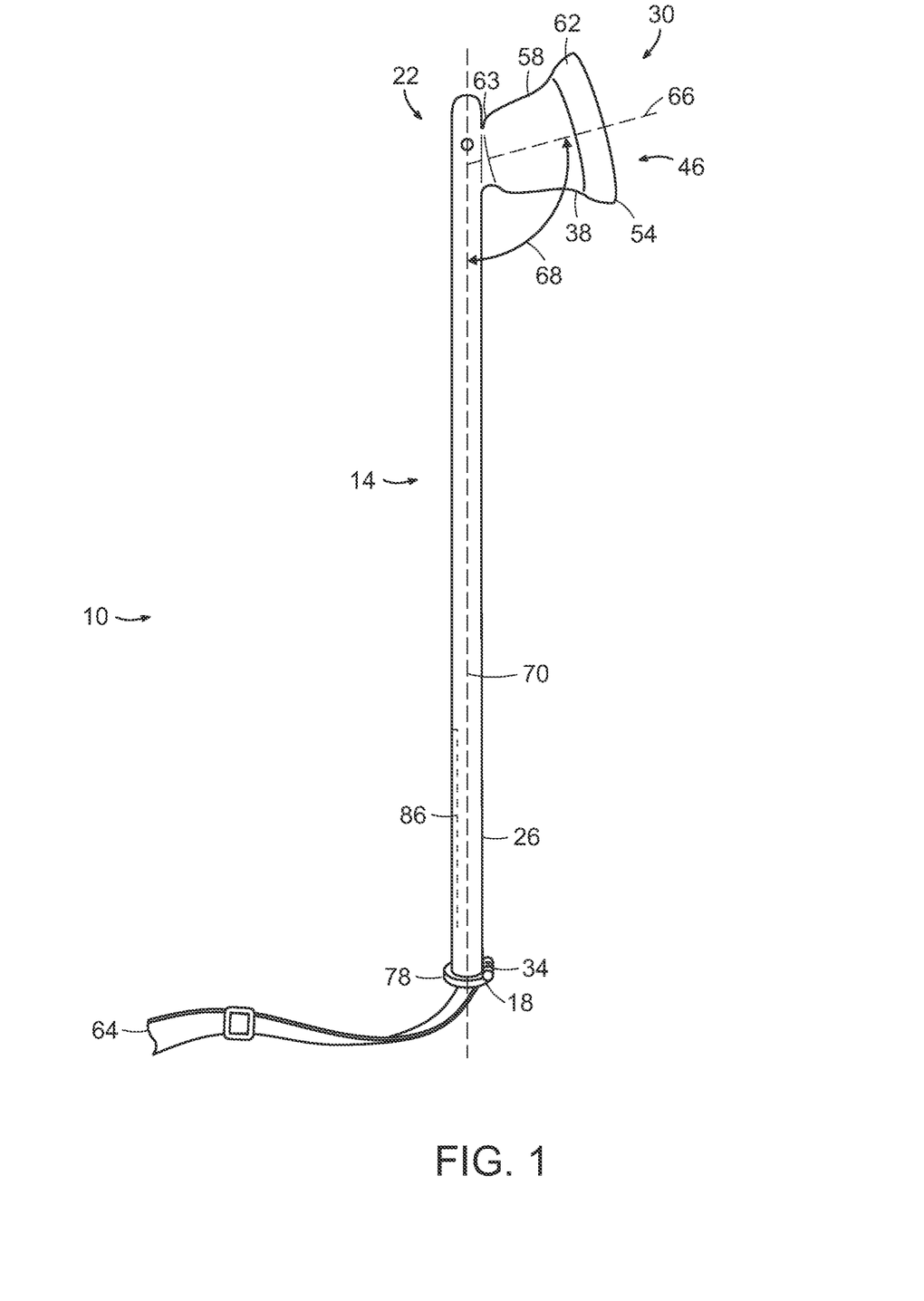
FIG. 1 illustrates a side view of a chum throwing device according to a non-limiting embodiment.

FIG. 1 illustrates an embodiment of a chumming device 10 that includes a shaft 14 with a proximal end 18 located opposite to a distal end 22. A gripping portion 26 is provided near the proximal end 18, and a chum holding container 30 is located toward the distal end 22. The container 30 maintains chum during use until it is released when a user swings the device 10 toward a targeted area of water. A level 34 is disposed near the proximal end 18 to provide a visual indication of the container's 30 position, as discussed below in more detail.

The container 30 may have a bell-like conical shape, formed by a rounded portion 38 that increases in diameter to an open end 46 with an outer rim 54. The container 30 may include a shoulder portion 58 connected to a waist portion 62 that curves outwardly to the outer rim 54. In an embodiment, the outer rim 54 may be thicker than the shoulder portion 58 and/or the waist portion 62 to provide stability and support for the container 30.

The bell shaped configuration, including the shoulder portion 58 that transitions to the waist portion 62, helps improve performance. The waist portion 62 with its increased diameter causes chum to initially settle into the shoulder portion 58, having a smaller diameter, when the device 10 is in the starting position shown in FIG. 5. Concentrating the chum in the shoulder portion 58 causes the chum to be held more tightly together, which allows the chum to be more resistant to spreading apart due to centripetal forces acting on the chum as the device 10 is swung. This configuration provides a tighter pattern of chum flying through the air and allows it to be more accurately thrown to a targeted area of water.

In an embodiment, the swinging process is made cleaner for the user due to the bell shaped configuration. The shoulder portion 58 with its narrower diameter causes the chum to be coated on the inside of the container 30, around an entire inside perimeter of the shoulder portion 58. Container shapes that cause chum to settle differently, such as settling toward one side of the container and closer to a rim, when in the starting portion, may result in chum spilling out of the container and onto the user even before the device is swung.

A base 63 of the container 30 is at least indirectly fixed to the shaft 14. The base 63 may be attached to the shaft 14 using various materials or parts, such as epoxy, adhesive, screws, bolts, rivets and the like. The shaft 14 and the container 30 may also be molded as a single unitary piece. The shaft 14 and container 30 may be made of various materials, including but not limited to plastic, graphite, fiberglass, lightweight metal or alloy, and the like. The shaft 14 and container 30 may be made of different materials or the same material.

As shown in FIG. 1, the container 30 may be coupled to a longitudinal side of the shaft 14, so that the open end 46 is positioned away from the shaft 14 by a distance that is equal to or greater than a length of the container 30. This positioning increases the chance of the open end 46 staying above water if the device 10 is accidently dropped. In an embodiment, the shaft 14 is hollow to trap air and allow the device 10 to float if dropped into the water. Allowing for the device 10 to be buoyant and stay afloat is useful since the user will be swinging the device 10 in close proximity to open water. Further, the hollow design allows the device 10 to be lightweight, making it easy to operate using one-hand, which benefits everyone including children and people with disabilities. In an embodiment, the shaft is sufficiently rigid to resist significant deflection during use. A strap 64 may extend from near the proximal end 18 for anchoring the device 10 to an object, including the user's body, to further help prevent losing the device during use.

In an embodiment, a central longitudinal axis 66 of the container 30 is positioned to form greater than a 90 degree angle 68 with respect to a central longitudinal axis 70 of the shaft 14. In accordance with an aspect, testing has shown during use that this configuration helps maximize the distance and accuracy of chum traveling through the air after leaving the container 30. More specifically, the central longitudinal axis 66 of the container 30 may be at an angle 68 between 100-110 degrees with respect to the central longitudinal axis 70 of the shaft 14. In one embodiment, the angle is set to be 105 degrees or substantially 105 degrees, which has been found to further provide consistent and accurate chumming, while preventing underthrowing and overthrowing the chum. In an embodiment, an angle of 105 degrees or about 105 degrees will assist with propelling the chum forward when the device 10 is swung and helps keep chum from clinging to a top, inside portion of the container 30 when coming to a stop, thereby helping the chum to release easily from the container 30 at the desired time and to prevent chum from raining down on the user.

In an embodiment, the shaft 14 may be approximately 32" inches long and have a diameter of approximately 1 inch. The gripping portion 26 may be in the form of a sleeve around the shaft 14 and/or in the form of embossments made directly in the handle, such as a crisscross pattern. Other forms of providing grip may be used, such as a suitable tape or coating that increases friction with the user's hand. As an example, the gripping portion 26 may extend approximately 1 foot up the shaft 14 from the proximal end 18. The proximal end 18 of the shaft 14 may also include a portion of increased diameter that forms a hand abutment portion 78 to further help keep the shaft 14 from slipping out of a user's hand. In an exemplary embodiment, the hand abutment portion 78 may be approximately 1¾ inches in diameter.

Figure 2:
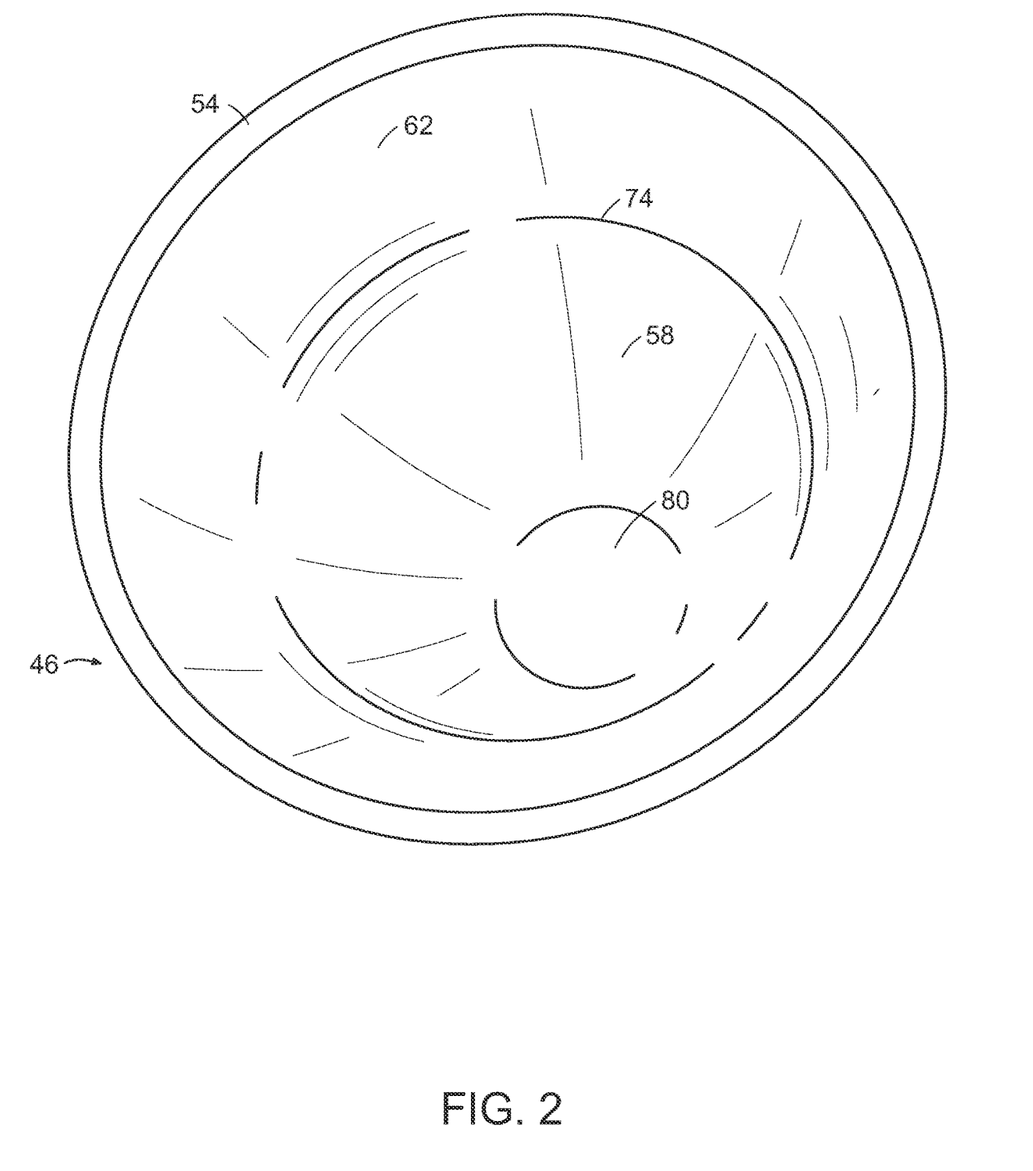
FIG. 2 illustrates a front view of the chum throwing device in FIG. 1 according to a non-limiting embodiment.

With additional reference to FIG. 2, the open end 46 of the container 30 is used to load chum into the container 30 and a closed end 80 contributes to holding chum in the container 30 during use. In an exemplary embodiment, the open end 46 of the container 30 has a diameter of approximately 4 inches, and a depth of the container 30 from the open end 46 to the closed end 80 is approximately 3 inches. An inner surface of the container 30 may include a fill line 74 disposed between the closed end 80 and the open end 46 to provide a visual indication of how much chum to load. In an embodiment, the fill line 74 is disposed approximately two inches up from the closed end 80 and may extend around the inside of the container 30. The fill line 74 may also be provided by a diameter transition point that creates a visual ring around the inside of the container 30 where a change in diameter is visually noticeable, such a where the shoulder portion 58 transitions to the waist portion 62. The position of the fill line 74 and an amount of chum that is used may be adjusted based on factors such as a type of chum, the amount of chum being used, the type or amount of fish being targeted, and the like. As such multiple fill lines 74 (not shown) may be included and labeled or color-coded based on the type of chum to be used, type of fish being targeted, etc.

Figure 3:
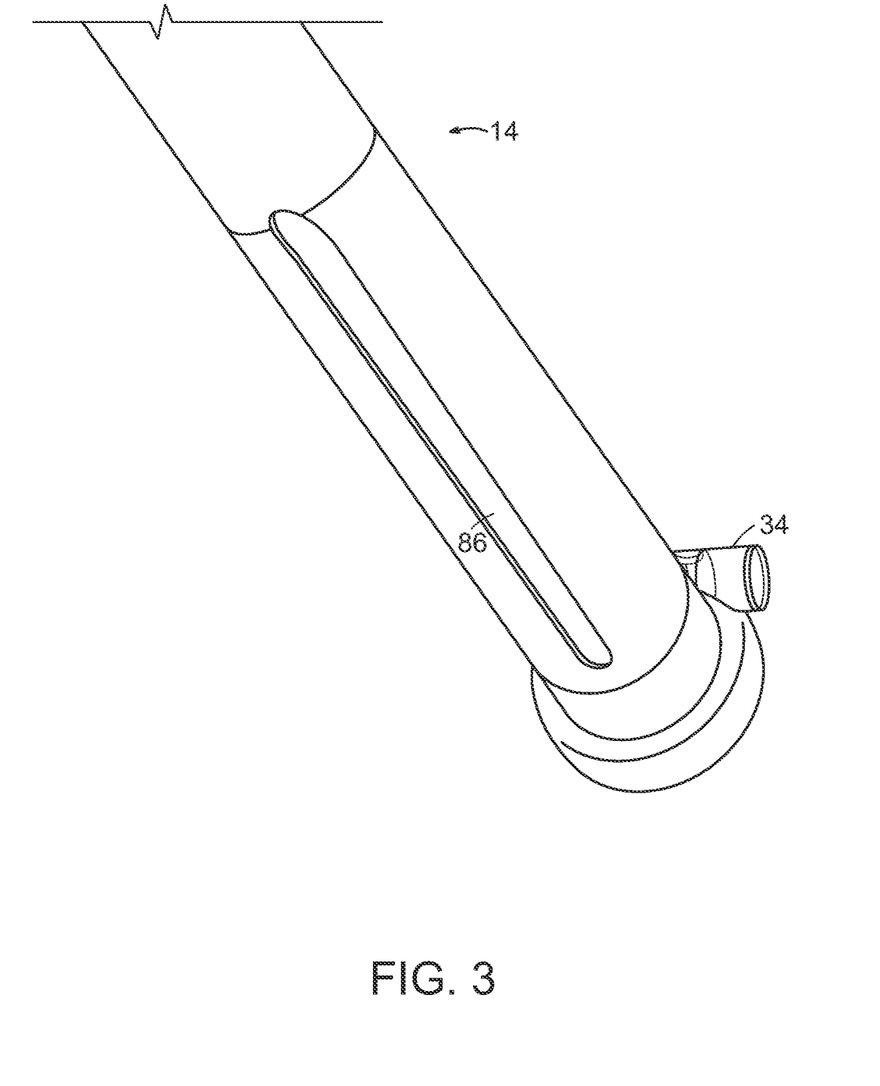
FIG. 3 illustrates a back view of the chum throwing device in FIG. 1 according to a non-limiting embodiment.

FIG. 3 illustrates an embodiment of the gripping portion 26 with an alignment groove 86 that extends along the backside of the shaft 14 opposite to the direction in which the open end 46 of the container 30 faces. The alignment groove 86 is configured to be engaged by a portion of the user's hand, such as a thumb, to help ensure proper hand alignment for aiming the device 10 and projecting the chum in the direction that the shaft 14 is swung. For example, the alignment groove 86 faces the opposite direction of the container's 30 open end 46 so that a user will know that the open end 46 is positioned to cast chum in a direction diametrically opposed to the direction faced by the alignment groove 86. A user can tell by sense of touch when the thumb is engaged with the alignment groove 86 thereby signaling to the user that the open end 46 of the container 30 is facing in the same general forward direction as the direction in which the thumb in pressed into the groove 86. A forward-facing groove could also be used for engaging the user's finger(s) to indicate a proper positioning of the device 10.

Figure 4A:
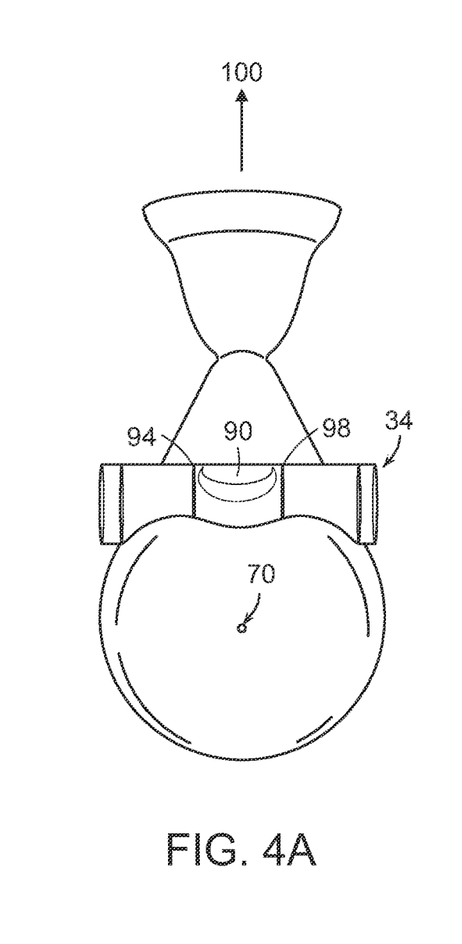
FIGS. 4A-4C illustrate a leveling mechanism of a chum throwing device according to an exemplary embodiment.
Figure 4B:
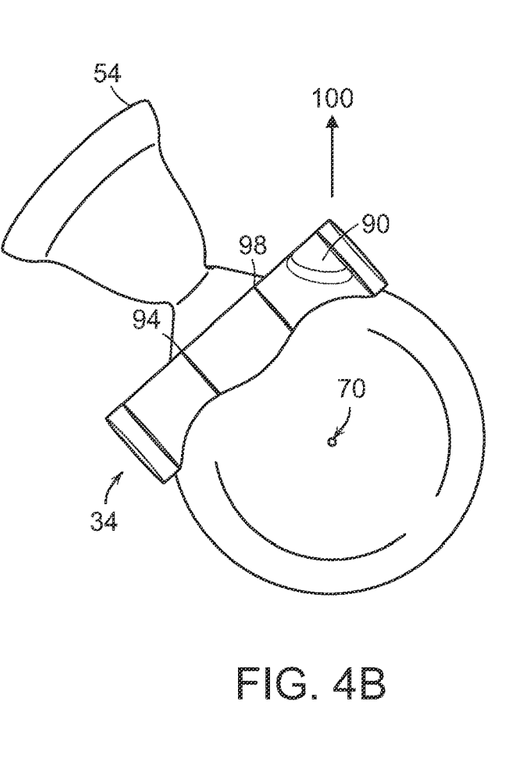
Figure 4C:
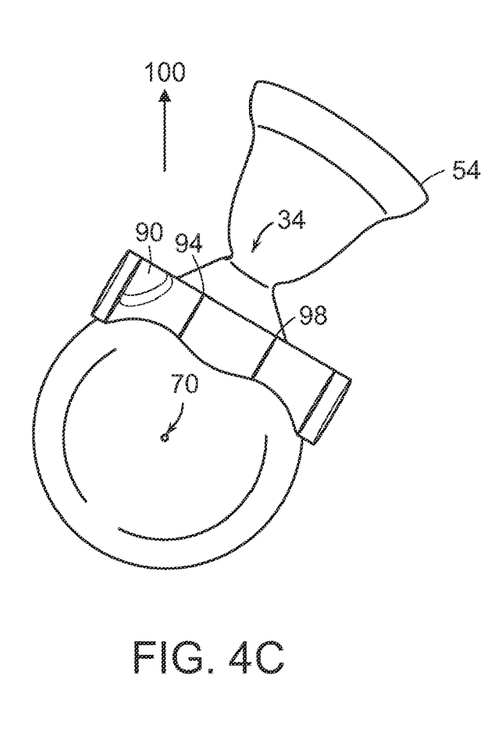

An aspect of embodiments herein is to provide efficient and accurate distribution of chum to a target area of water. The chum may be any substance that could attract fish, including minced bait fish. Chum that spills out of the container 30 during use without reaching a target area of water creates waste and an unnecessary mess. As shown in FIGS. 4A-4C, according to an embodiment, the level 34 is positioned at least indirectly on the shaft 14 or otherwise incorporated into the shaft 14 to indicate when the shaft is positioned properly prior to and during swinging of the shaft 14. The level 34 may be incorporated with the shaft 14, for example, by creating a friction fit or press fit between the level 34 and a recessed portion of the shaft 14 so that the level 34 snaps into place or is otherwise maintained to allow for ease of assembly. Adhesive could also be used to hold the level 34 in place on the shaft 14. In an embodiment, the 34 level is incorporated within the enlarged portion 78 of the shaft 14 at the proximal end 18. The level 34 can be positioned anywhere on the shaft 14 where it is visible during use of the device 10. The level 34 may include a sealed compartment that houses a fluid and a gas bubble 90 to provide a visual indication of level's 34 position. Since the specific gravity of the fluid is greater than that of gas bubble 90, the bubble 90 will rise to the highest point in the level 34.

The level 34 may be demarcated into three sections, bound by two parallel lines 94, 98 that are visible from outside the level 34. The level 34 may be oriented orthogonal to the longitudinal axis 70 of the shaft and calibrated or positioned so that when the open end 46 of container 30 faces directly upwards, as shown in FIG. 4A, the bubble 90 is centered between the parallel lines 94, 98. Chum should not spill out of the container 30 in this position because the container 30 is facing upwardly and the container 30 is not tilted. For example, the container 30 is not tilted left or right, with respect to an upwardly pointing direction 100 when the shaft 14 is held horizontally, when looking into the page of FIG. 4A. As shown, the container 30 is not tilted to a left longitudinal side of the shaft or a right longitudinal side of the shaft, e.g., the container 30 is not tilted to the left or right when looking down the longitudinal axis 70 of the shaft 14. The level 34 is therefore indicative of a rotational position of the container around the longitudinal axis of the shaft. If the container 30 was sufficiently tilted to either side, chum could spill out of the container 30.

FIG. 4B shows the container 30 twisted in a counterclockwise direction thereby causing the bubble 90 to shift to the right indicating that the container 30 is titled to the left side, when looking into the page of FIG. 4B down the longitudinal axis 70 of the shaft 14. The container 30 is therefore tilted with respect to the upwardly pointing direction 100, e.g., titled to the left. Chum may spill out of the container 30 in this position and run over the rim 54. FIG. 4C shows the container 30 twisted in a clockwise direction thereby causing the bubble 90 to shift to the left. Similarly, the container 30 is tilted with respect to the upwardly pointing direction 100, e.g., tilted to the right, such that chum may spill out of the container 30, again running over the rim 54. In an embodiment, the bubble 90 is centered when the shaft 14 is held horizontally and the container 30 is not tilted to the left or right, and the bubble 90 is not centered when the shaft 14 is held horizontally and the container 30 is tilted to either the left or right.

The unique positioning of the level 34 with respect to the container's opening 46 contributes to providing an effective device 10 for delivering chum. A user can monitor the level 34 to make sure the bubble 90 stays centered before starting to swing the shaft 14 toward a target area of water. To release the chum, the user may swing the shaft 14 so that the open end 46 of the container 30 travels in an arched direction upwardly and then toward a targeted area of water until the momentum of the chum causes it to be propelled outwardly and away from the container 30.

Figure 5:
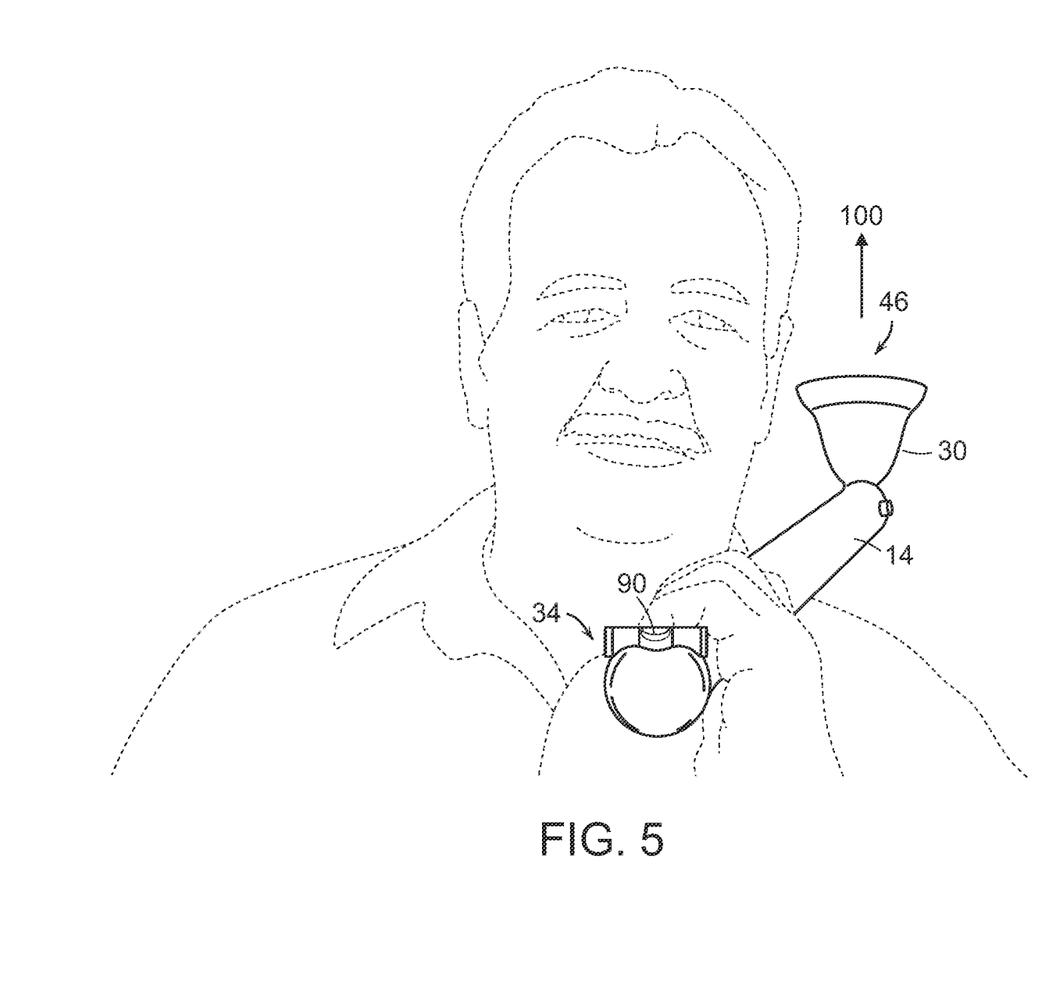
FIG. 5 illustrates the chum throwing device of FIG. 1 being held in an aligned starting position according to a non-limiting embodiment.

FIG. 5 illustrates a user holding the chum throwing device 10 in a starting position. As shown, the bubble 90 of the level 34 is centered, indicating that the container 30 is facing upwardly and is not tilted with respect to the upwardly facing direction 100. A user can rely on the visual indication provided by the level 34 to ensure that the container 30 remains properly positioned before swinging the shaft 14. To initiate a swinging motion, the user rotates the shaft 14, causing the open end 46 of the container 30 to rotate in an arched manner towards a target area of water.

Figure 6:
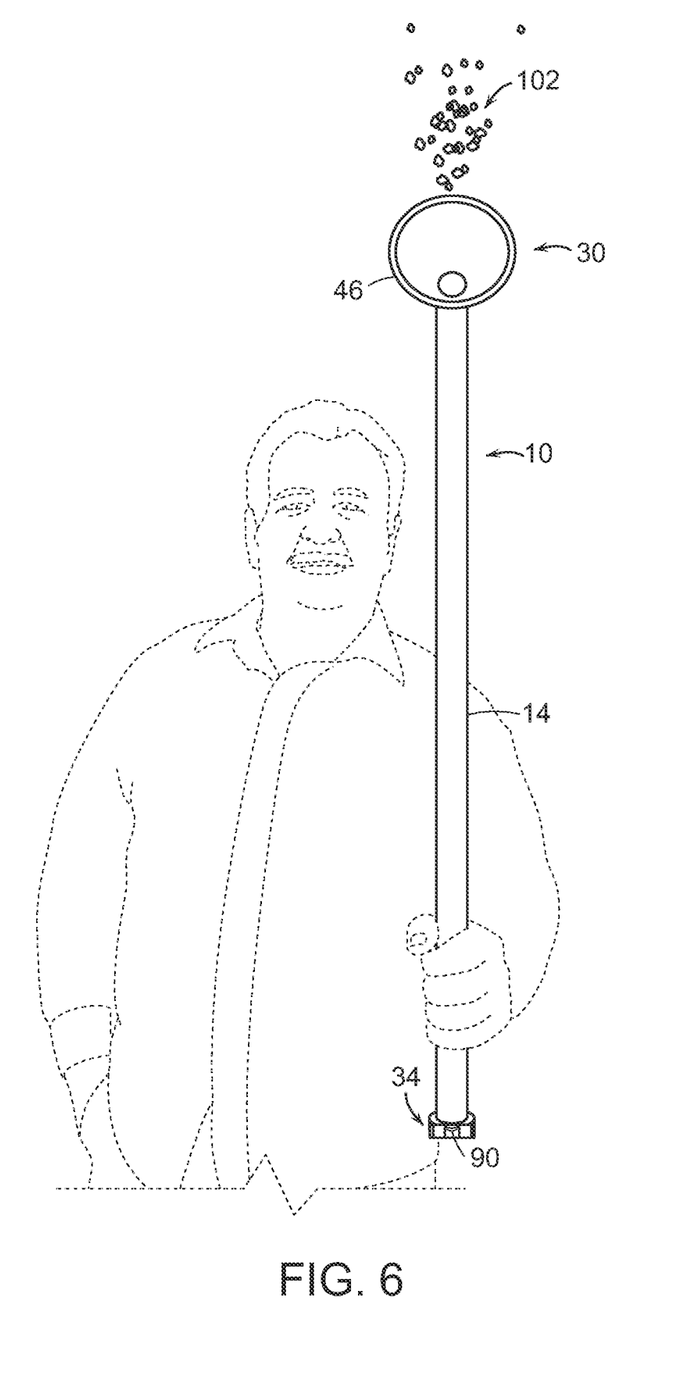
FIG. 6 illustrates the chum throwing device of FIG. 1 being held in an aligned ending position according to a non-limiting embodiment.

FIG. 6 illustrates the stopped position of the device 10 during use. As shown, the bubble 90 of the level 34 remains centered, and the open end 46 of the container 30 faces away from the user in a direction aligned with a trajectory of the container 30 that was produced as the device 10 swung. Chum 102 is released from the container 30 in the stopped position due to centrifugal force and momentum imparted to the container 30, and therefore the chum 102, during the swinging motion.

Figure 7:
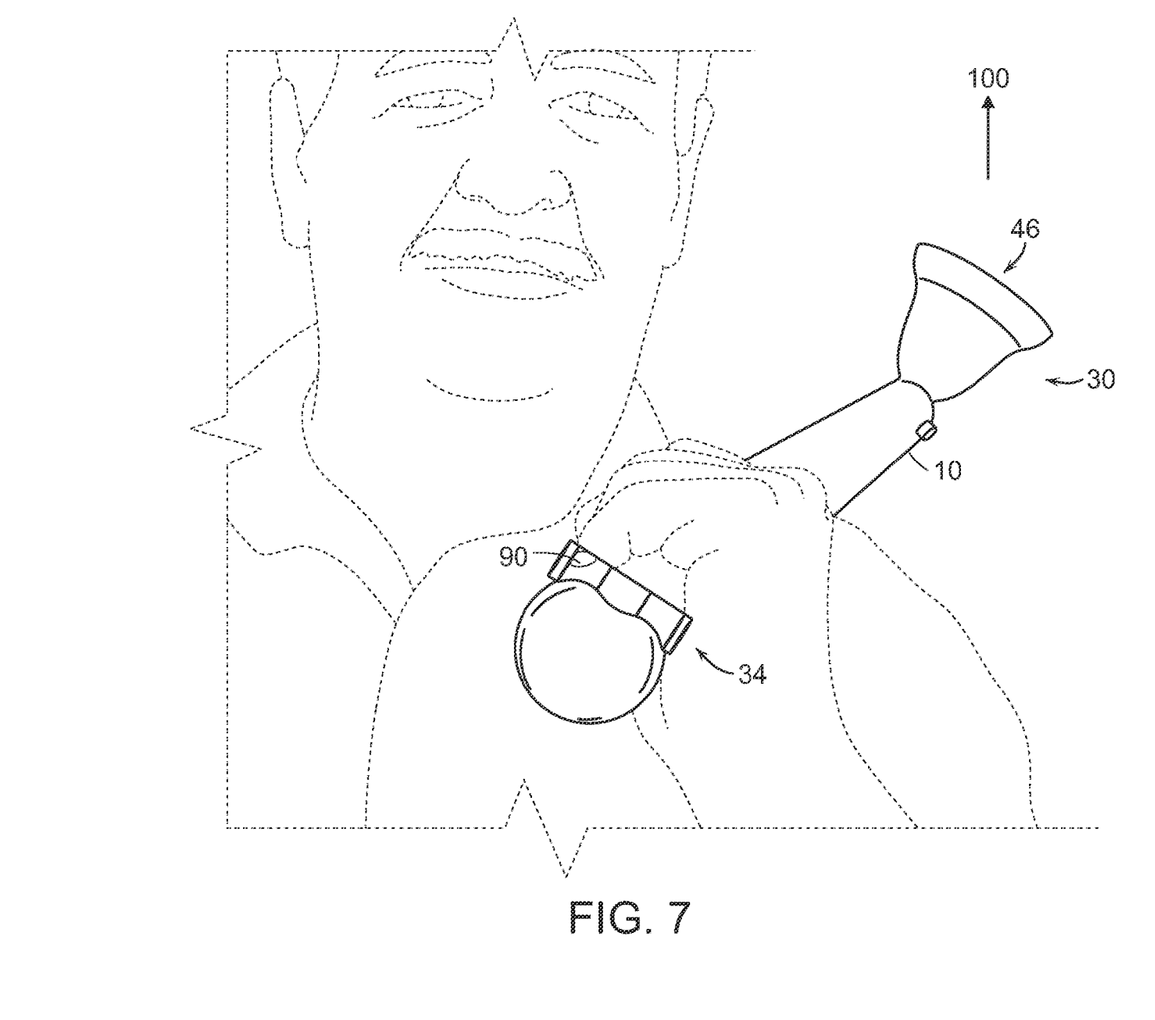
FIG. 7 illustrates the chum throwing device of FIG. 1 being held in an unaligned starting position according to a non-limiting embodiment.
Figure 8:
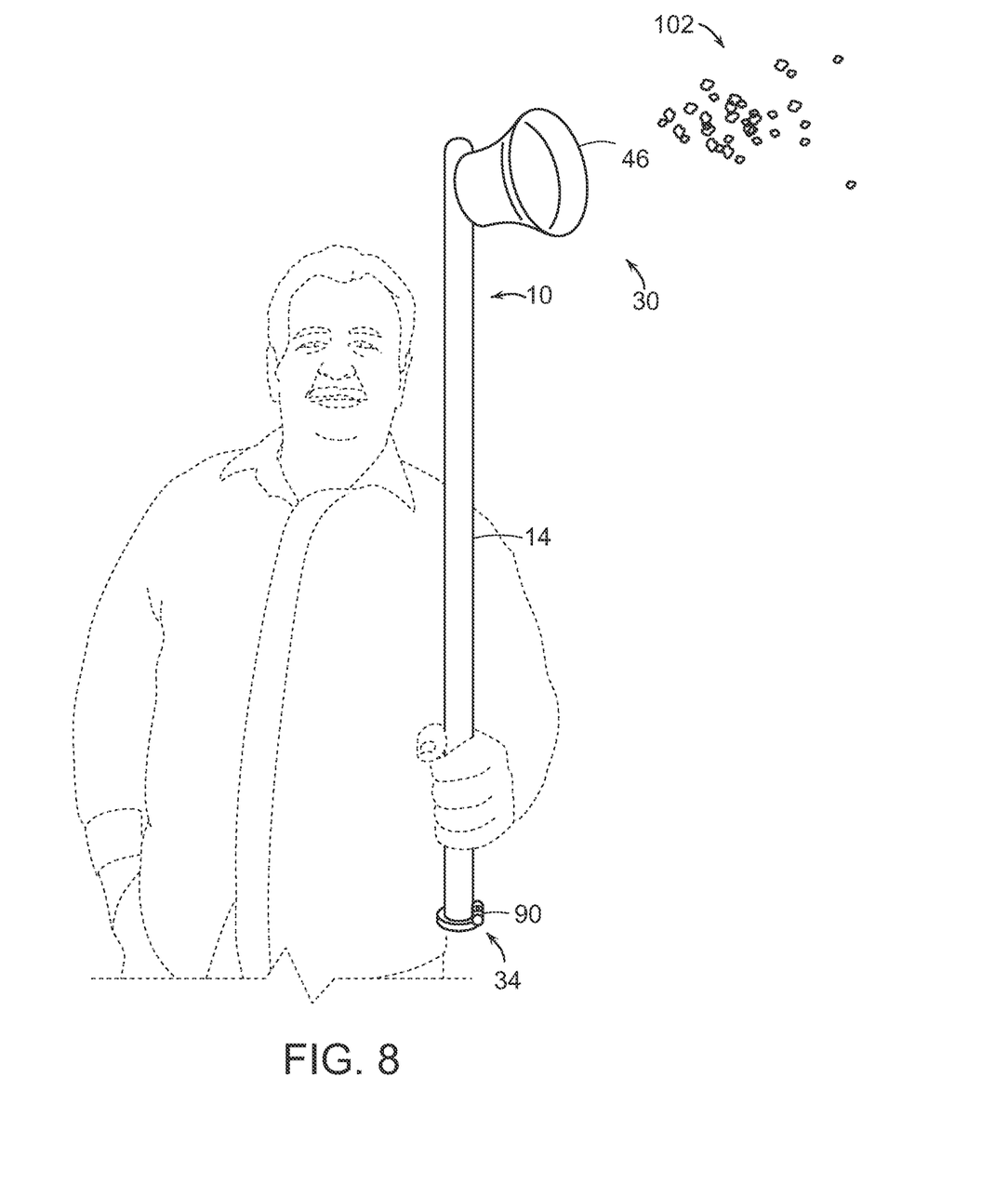
FIG. 8 illustrates the chum throwing device of FIG. 1 being held in an unaligned ending position according to a non-limiting embodiment.

FIG. 7 illustrates a user holding the chum throwing device 10 in an initial unaligned starting position. As depicted, the bubble 90 of the level 34 is shifted to the left, indicating that the open end 46 of the container 30 is titled with respect to the upwardly facing direction 100. This type of positioning is undesirable because chum may spill from the container 30 before the device 10 is even swung. In this scenario, the open end 46 of the container 30 is oriented away from the user and is not aligned with an arching path that the container 30 will follow when the device 10 is swung. As the user begins to swing the device 10, chum may continue to spill, creating a mess and wasted chum. Continuing to swing the device 10 in an unaligned manner can lead to the orientation shown in FIG. 8, where the open end 46 of the container 30 faces a direction that deviates from the arching path or trajectory of the container 30 made by swinging the device 10. For example, when the device 10 is not aligned properly in the starting position, the trajectory of the container 30 moves toward an area in front of the user; however, the open end 46 of the container 30 faces to the side of the user because of the misalignment. Consequently, the chum 102 may not be effectively propelled toward a target area of water and may instead land in unintended areas, potentially on the user. The user can visually detect misalignment using the level 34 during use and make adjustments by rotating the shaft until the bubble 90 is centered, indicating proper alignment.

The level 34 may be in the form of a sealed tube, vial, or circular compartment made of a transparent material such as glass or plastic. The level 34 may contain water, alcohol, chloroform, or some other suitable liquid, as is known in the art. In an embodiment, the level 34 may be straight or slightly curved and have any number of visual indicator lines to demarcate the center of the tube. When the level 34 is in the form of a circular or round compartment, crosshair type indicator lines may be used.

Figure 9:
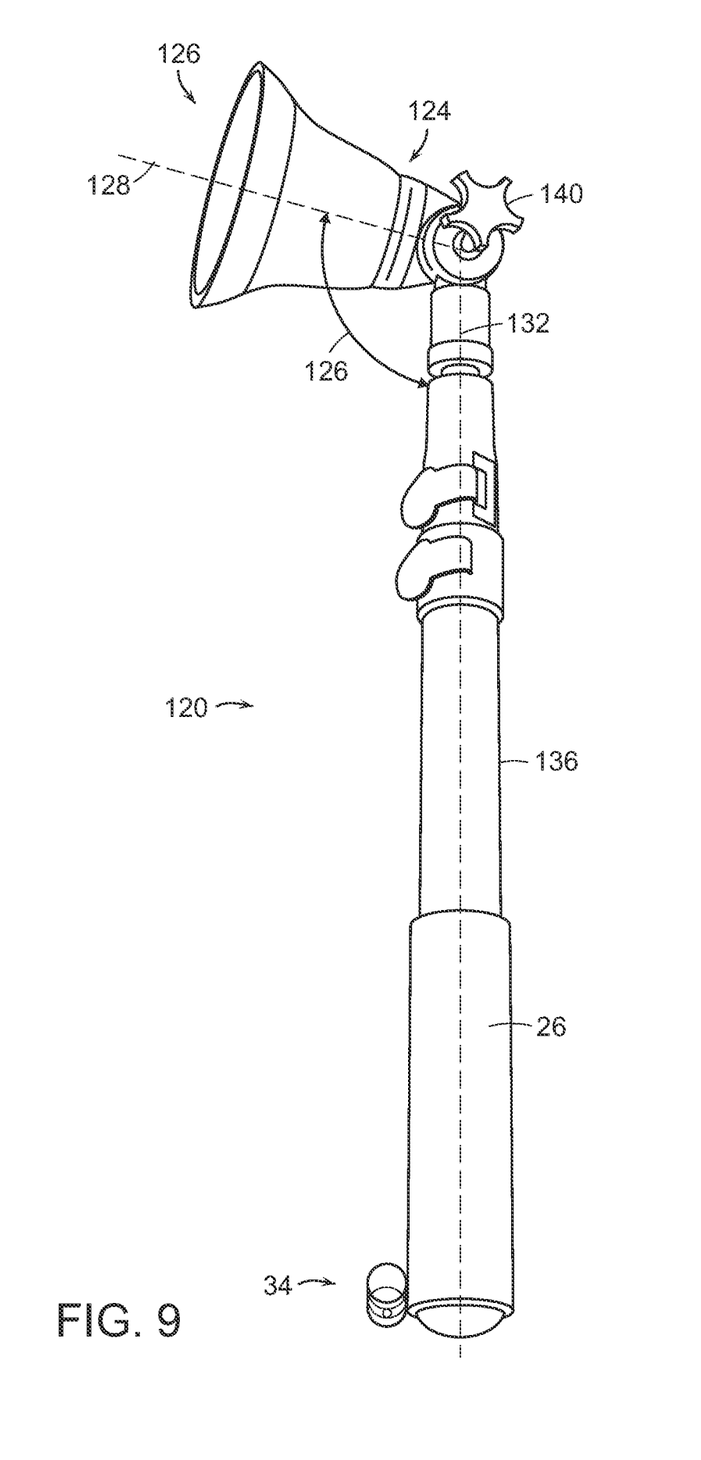
FIG. 9 illustrates a side view of a chum throwing device according to a non-limiting embodiment.

FIG. 9 illustrates an embodiment of a chum throwing device 120 with an adjustable container 124 having an opening 126. The container 124 can be adjusted to change an angle 126 between a center longitudinal axis 128 of the container 124 and a central longitudinal axis 132 of the shaft 136. The adjustability may be provided by a mechanism, such as a thumb screw 140, that fastens the container 124 to the shaft 136. The thumb screw 140 is configured to be easily grasped by the user's fingers. Adjusting the angle 126 of the container 124 allows the user to finetune the trajectory of the chum. As noted above, it has been found that an optimum positioning of the container 124 is at or near 105 degrees between the center longitudinal axis 128 of the container 124 and the center longitudinal axis 132 of the shaft 136. As described above, a level 34 is used indicate proper positioning of the device 120. The descriptions provided above for FIGS. 1-8 regarding the container 30, including the shapes, attributes, and angles with respect to the shaft 14, apply equally to the embodiments of FIGS. 9-12.

Figure 10:
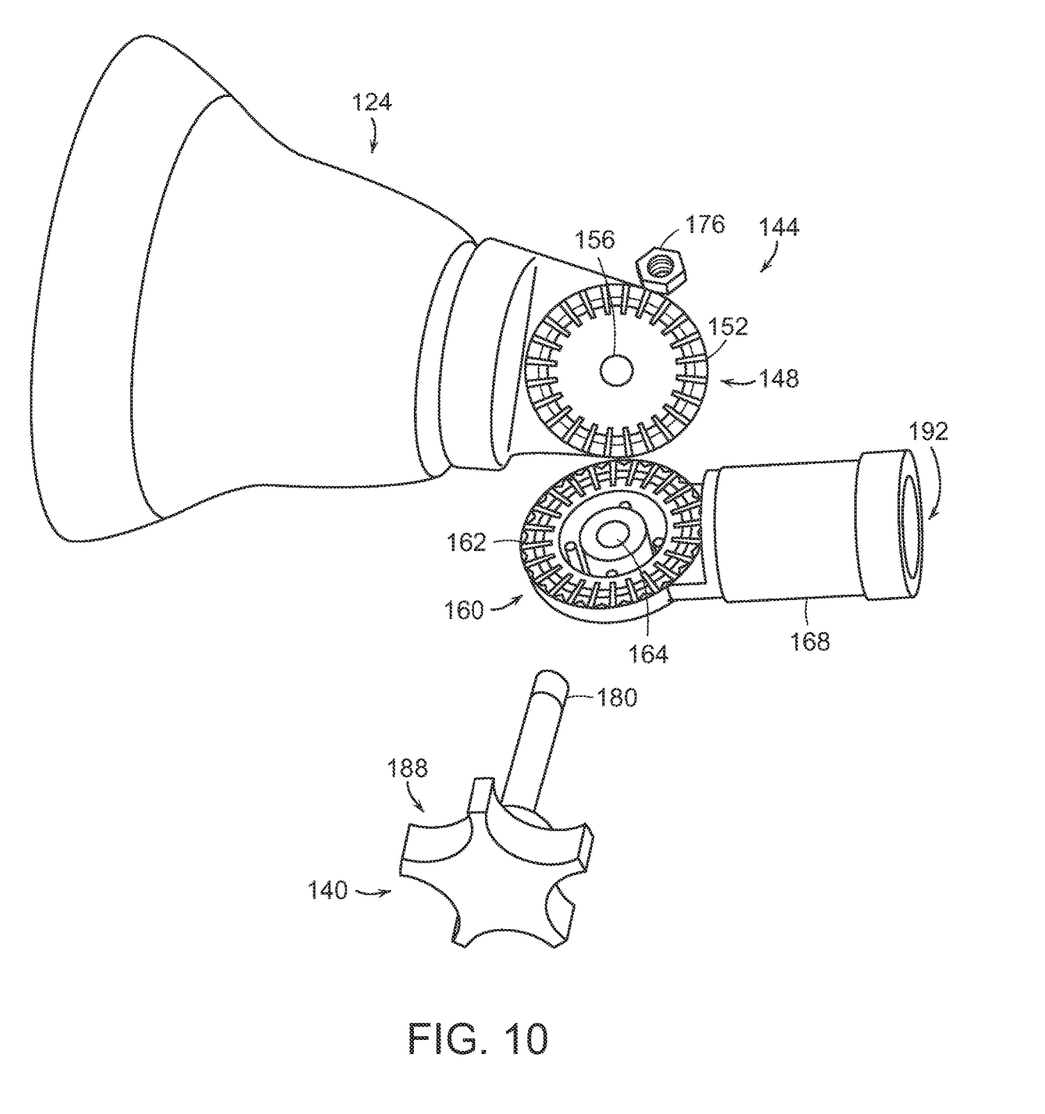
FIG. 10 illustrates an exploded view of a container adjuster of a chum throwing device according to a non-limiting embodiment.
Figure 11:
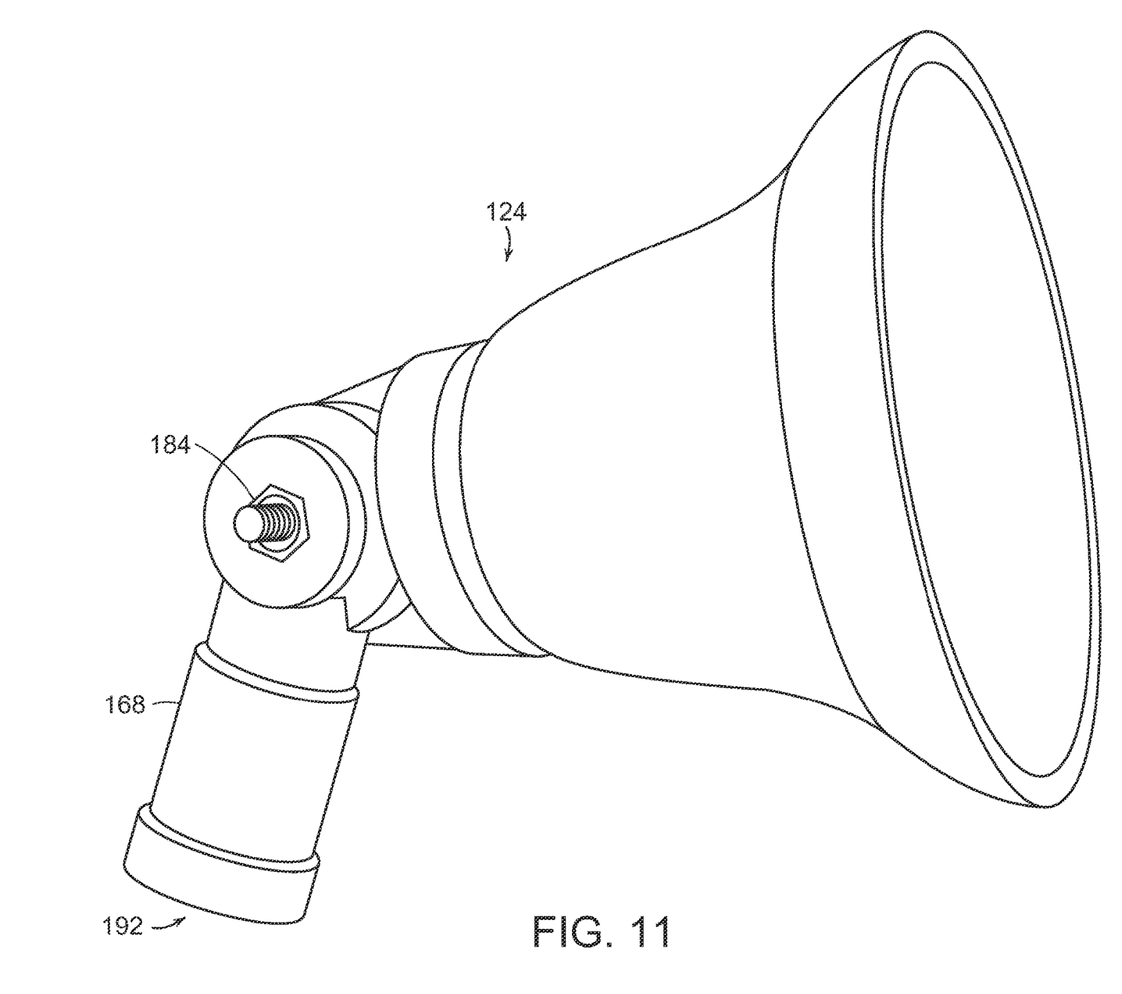
FIG. 11 illustrates a side view of a container for a chum throwing device according to a non-limiting embodiment.

FIG. 10 illustrates an embodiment of an angle adjustment mechanism 144 for the container 124. The adjustment mechanism 144 includes a first face 148 with teeth 152 dispersed radially away from a center hole 156. A second face 160 is provided with teeth 162 and a similar center hole 164. The second face 160 is part of a shaft attachment component 168 that is discussed below in more detail. The teeth 152 on the first face 148 have a similar shape to the teeth 162 on the second face 160, enabling the first and second faces 148, 160 to mesh together in a non-rotatable manner when the teeth 152, 162 are offset from each other and pressed together. For example, high points of the teeth 152 on the first face 148 can rest in low points between the teeth 162 on the second face 160, so that the faces 148, 160 are secured in a non-rotatable manner. The center holes 156, 164 are concentrically aligned with the first and second faces 148, 160 when assembled. A fastener, such as the thumbscrew 140, passes through center holes 156, 164 and protrudes sufficiently for a retaining piece, such as a nut 176, to engage a threaded section 180 of the thumbscrew 140. With additional reference to FIG. 11, the nut 176 can be held in place by a recessed portion 184 formed in the shape of the nut 176 that keeps the nut 176 from rotating. The threaded section 180 advances into corresponding threaded portions of the nut 176 when the thumbscrew 140 is turned. The first and second faces 148, 160 are pulled closer to each other as the thumbscrew 140 is tightened until the teeth 152, 162 of the faces 148, 160 interlock with each other. To readjust the container's 124 angle, the thumbscrew 140 can be loosened, allowing the first and second 148, 160 faces to rotate with respect to each other until a desired position is achieved. The thumbscrew 140 is retightened to secure the first and second faces 148, 160 in place. The thumbscrew 140 can be made of suitable materials, such as plastic, metal, alloy and the like, with one or more recesses 188 that are configured to engage the user's fingers. The shaft 136 of the chum throwing 10 device may be screwed into a receiving opening 192 of the attachment component 168. An adhesive can also be used to couple the shaft 136 to the attachment component 168.

Figure 12:
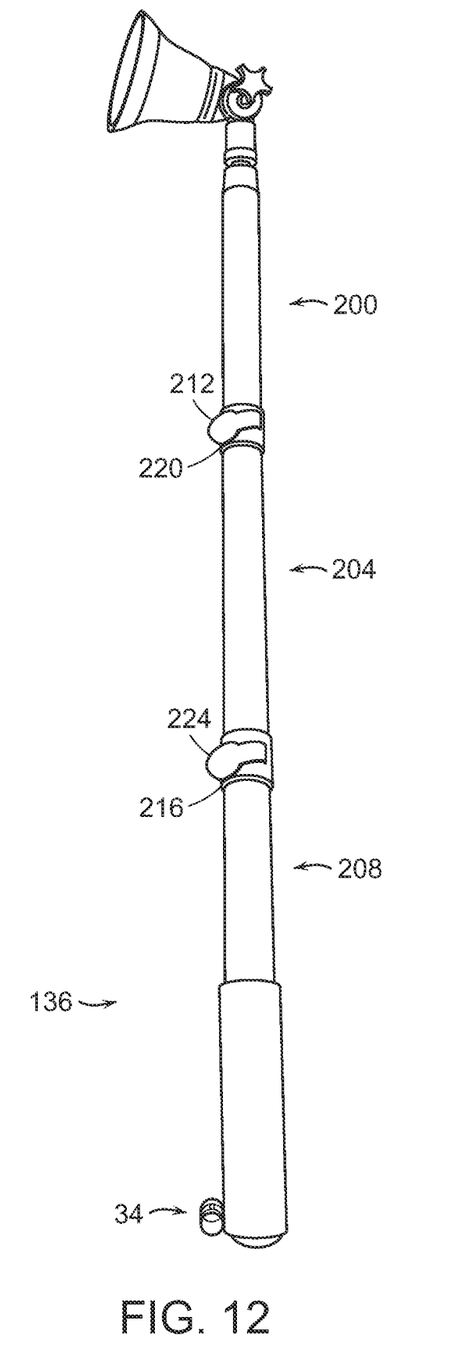
FIG. 12 illustrates the chum throwing device of FIG. 9 in an extended configuration according to a non-limiting embodiment.

With reference to FIG. 12, an embodiment of the chum throwing device 120 includes telescoping sections 200, 204, 208 to permit the shaft's 136 length to be changed. Locking mechanisms 212, 216 are used to release and subsequently tighten the telescoping sections 200, 204, 208 when a desired length is achieved. In use, tabs 220, 224 of the locking mechanisms 212, 216 are pulled away from the shaft 136 to release pressure, and the tabs 220, 224 are pushed toward the shaft 136 to apply pressure. The embodiment of FIG. 12 shows two locking mechanisms 212, 216; however, more or less locking mechanisms can be used.

The telescoping sections 200, 204, 208 may comprise tubes that are slidably received within each other. For example, section 200 may be received within section 204, and section 204 may be received within section 208. The locking mechanisms 212, 216 may be cam style locks that work by pressing, for example, the outer telescoping section 208 firmly against the inner telescoping section 204.

The locking mechanisms 212, 216 can be separately used. Activating only one of locking mechanisms 212, 216 may be sufficient if a small length adjustment is needed. Maximum extension of the shaft 136 is obtained when both locking mechanisms 204, 208 are released so that the telescoping sections 200, 204, 208 can each be pulled longitudinally to their maximum lengths. Other types of locking mechanisms may be used, such as pin locks, lever locks, and clamp locks, and the like.

Figure 13:
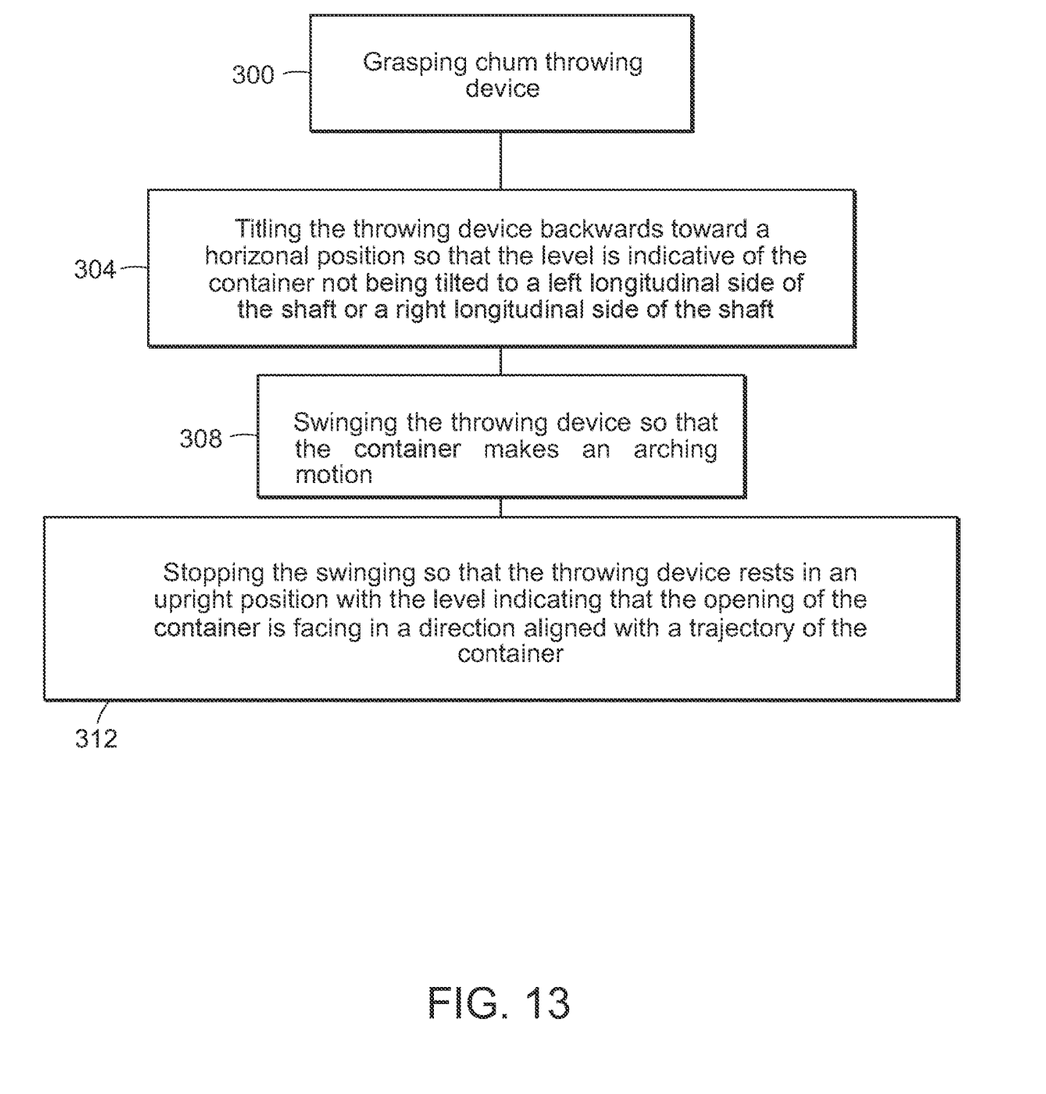
FIG. 13 is a flow chart of a method of using a chum throwing device according to a non-limiting embodiment.

FIG. 13 illustrates a method of using chum throwing devices according to embodiments disclosed herein. In step 300, the chum throwing device 10, 120 is grasped by a user. The device 10 includes the shaft 14, 136 for mounting the chum holding container 30, 124 and the level 34. In step 304, a user tilts the chum throwing device 10, 120 backwards to a horizontal starting position so that the level 34 is indicative of the opening 30, 126 of the chum holding container 30, 124 facing upwardly, as described with reference to FIGS. 4A and 5, for example. The user swings the throwing device 10, 120 in step 308 so that the container 30, 124 makes an arching motion toward an area in front of the user. The user then stops or slows the motion of the holding container 30, 124 in step 312 so that the opening 30, 126 faces in a direction away from the user and the opening 30, 126 of the container 30, 124 faces an area aligned with a trajectory of the container, as shown for example in FIG. 6, such that chum is released from the holding container 30, 124. The method may further include adjusting an angle between a longitudinal center line 128 of the container 124 and a longitudinal center line 132 of the shaft 136, as discussed with respect to FIG. 9. The method may also include adjusting a length of the shaft 136, as discussed with respect to FIG. 12.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

The invention claimed is:

1. A chum throwing device comprising:
   a shaft;
   a container attached to the shaft, the container being configured to hold chum and having an open end that faces away from the shaft; and
   a level attached to the shaft, the level being indicative of a rotational position of the container around a longitudinal axis of the shaft,
   wherein the shaft includes an enlarged portion at a proximal end of the shaft opposite the container, and the level is attached to the enlarged portion, and
   wherein the container has a closed end at least indirectly attached to the shaft and a longitudinal axis that extends through centers of the closed end and the open end respectively so as to intersect the shaft, and the container is positioned on the shaft so that an angle between the longitudinal axis of the shaft and the longitudinal axis of the container is between 100 degrees and 110 degrees.

2. The chum throwing device of claim 1, wherein the container comprises a shoulder portion and a waist portion, the shoulder portion having a diameter that is less than a diameter of the waist portion, and the waist portion extending outwardly toward the open end of the container.

3. The chum throwing device of claim 1, wherein the angle is approximately 105 degrees.

4. The chum throwing device of claim 1, wherein the shaft includes a groove extending longitudinally on a back portion of the shaft that faces away from the open end of the container, and wherein the groove is configured to be contacted by a user's thumb for aiming the device.

5. The chum throwing device of claim 1, wherein the container is attached to a longitudinal side of the shaft.

6. The chum throwing device of claim 1, wherein the level comprises a gas bubble that is centered when the shaft is held horizontally and the container is not tilted to a left or right side when looking down the longitudinal axis of the shaft, and the bubble is not centered when the shaft is held horizontally and the container is tilted to the left or the right side when looking down the longitudinal axis of the shaft.

7. The chum throwing device of claim 6, wherein the level comprises a sealed tube that includes the gas bubble and visible lines that demarcate a center portion of the level.

8. The chum throwing device of claim 1, wherein the shaft is hollow.

9. The chum throwing device of claim 1, wherein the shaft has a grip portion with an embossed pattern.

10. A chum throwing device comprising:
    a shaft;
    a container attached to the shaft, the container being configured to hold chum and having an open end that faces away from the shaft, the container having a shoulder portion with a round inner circumferential surface and a waist portion with a round inner circumferential surface, the shoulder portion having a diameter that is less than a diameter of the waist portion, and the waist portion extending outwardly to a rim that forms the open end; and
    a level attached to the shaft, the level being indicative of a rotational position of the container around a longitudinal axis of the shaft,
    wherein the shoulder portion includes a closed end of the container and is connected to the shaft, and wherein the container has a longitudinal axis that extends through a center of the open end and through a center of the closed end so as to intersect the shaft, and
    wherein the container is positioned on the shaft so that an angle between the longitudinal axis of the shaft and the longitudinal axis of the container is between 100 degrees and 110 degrees.

11. The chum throwing device of claim 10, wherein the angle is approximately 105 degrees.

12. The chum throwing device of claim 10, wherein the shaft includes a groove extending longitudinally on a back portion of the shaft that faces away from the open end of the container, and wherein the groove is configured to be contacted by a user's thumb for aiming the device.

13. The chum throwing device of claim 10, wherein the shaft includes an enlarged portion at a proximal end, the enlarged portion having a diameter that is larger than a diameter of the shaft at a location other than the enlarged portion, and wherein the level is at least indirectly attached to the enlarged portion.

14. The chum throwing device of claim 10, wherein the level comprises a gas bubble that is centered when the shaft is held horizontally and the container is not tilted to a left or right side when looking down the longitudinal axis of the shaft, and the bubble is not centered when the shaft is held horizontally and the container is tilted to the left or the right side when looking down the longitudinal axis of the shaft.

15. The chum throwing device of claim 14, wherein the level comprises a sealed tube that includes the gas bubble and visible lines that demarcate a center portion of the level.

16. The chum throwing device of claim 10, wherein the shaft is hollow.

17. The chum throwing device of claim 10, wherein the shaft has a grip portion with an embossed pattern.

* * * * *